US008181926B2

(12) United States Patent
Magno, Jr. et al.

(10) Patent No.: US 8,181,926 B2
(45) Date of Patent: May 22, 2012

(54) PANEL CLAMP

(75) Inventors: Joey D. Magno, Jr., Cordova, TN (US);
Robert K. Jolly, Cordova, TN (US);
Andrew C. Cole, Southaven, MS (US);
Cong T. Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 259 days.

(21) Appl. No.: 12/691,997

(22) Filed: Jan. 22, 2010

(65) Prior Publication Data

US 2011/0179606 A1 Jul. 28, 2011

(51) Int. Cl.
*A47G 29/02* (2006.01)

(52) U.S. Cl. ............... 248/237; 248/220.21; 411/85; 411/104; 411/112

(58) Field of Classification Search ............... 248/72, 248/237, 214, 220.21; 411/85, 101, 104, 411/106, 108, 112
See application file for complete search history.

(56) References Cited

U.S. PATENT DOCUMENTS

| | | | |
|---|---|---|---|
| 2,345,650 A | 4/1944 | Attwood | |
| 2,767,951 A | 10/1956 | Cousino | |
| 3,429,601 A | 2/1969 | Bremers | |
| 4,146,074 A | 3/1979 | Kowalski | |
| 4,239,139 A | 12/1980 | Bott | |
| 4,377,360 A | 3/1983 | Kennedy | |
| 4,410,298 A | 10/1983 | Kowalski | |
| 4,460,299 A | 7/1984 | Kowalski | |
| 4,830,531 A | 5/1989 | Condit et al. | |
| 5,154,385 A | 10/1992 | Lindberg et al. | |
| 5,893,538 A | 4/1999 | Onishi et al. | |
| RE36,681 E | 5/2000 | Rinderer | |
| 6,145,264 A * | 11/2000 | Dallaire | 52/506.07 |
| 6,360,491 B1 * | 3/2002 | Ullman | 52/22 |
| 6,644,901 B2 | 11/2003 | Breckel | |
| 6,672,018 B2 * | 1/2004 | Shingleton | 52/173.3 |
| 6,872,038 B2 | 3/2005 | Westlake | |
| 7,156,593 B1 | 1/2007 | Saward et al. | |
| 7,604,444 B2 | 10/2009 | Wu | |
| 7,621,487 B2 * | 11/2009 | Brown et al. | 248/65 |
| 2003/0101662 A1 * | 6/2003 | Ullman | 52/27 |
| 2003/0177706 A1 * | 9/2003 | Ullman | 52/3 |
| 2010/0276558 A1 * | 11/2010 | Faust et al. | 248/222.14 |
| 2011/0100434 A1 * | 5/2011 | Van Walraven | 136/251 |
| 2011/0214365 A1 * | 9/2011 | Aftanas | 52/173.3 |

* cited by examiner

*Primary Examiner* — Bradley Duckworth
(74) *Attorney, Agent, or Firm* — Snyder, Clark, Lesch & Chung, LLP

(57) ABSTRACT

A clamp includes a first member, a washer, a nut, a threaded bolt, a spring and a torsion spring. The first member may include side portions and have a first opening. The washer may include a second opening and at least one portion protruding in a downward direction from an upper surface of the washer. The nut may have an upper surface, a lower surface and a threaded opening. The threaded bolt may be disposed through the first opening, the second opening and the threaded opening. The spring may be located between a portion of the first member and the washer. The torsion spring may be located between the washer and the nut, where the torsion spring causes the nut to rotate when force is applied to an upper part of the first member.

17 Claims, 19 Drawing Sheets

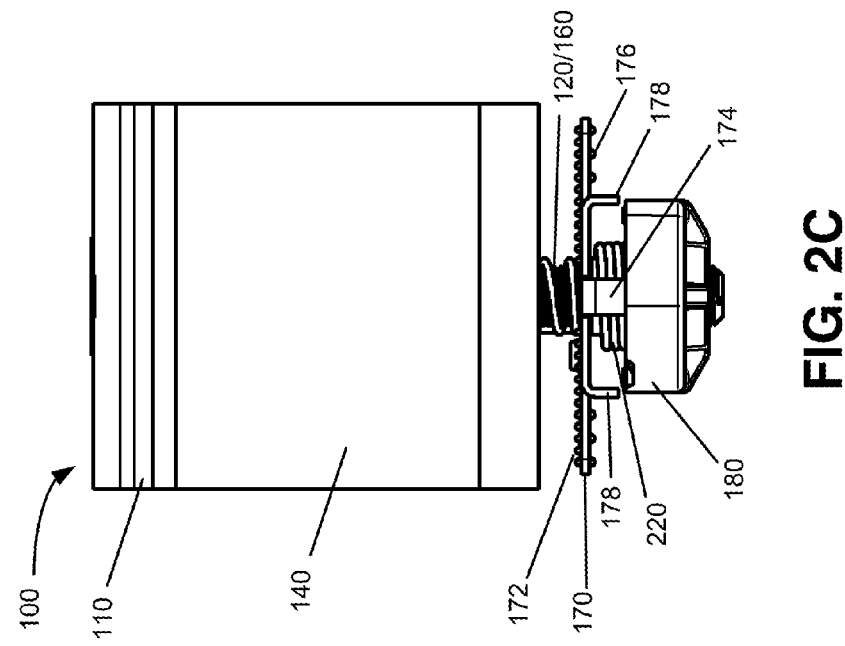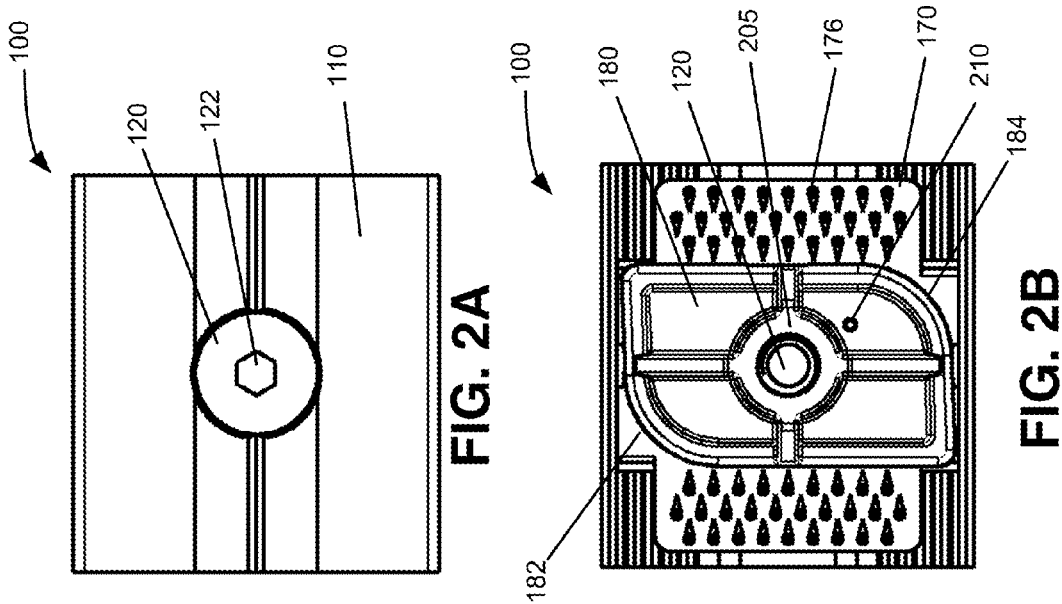

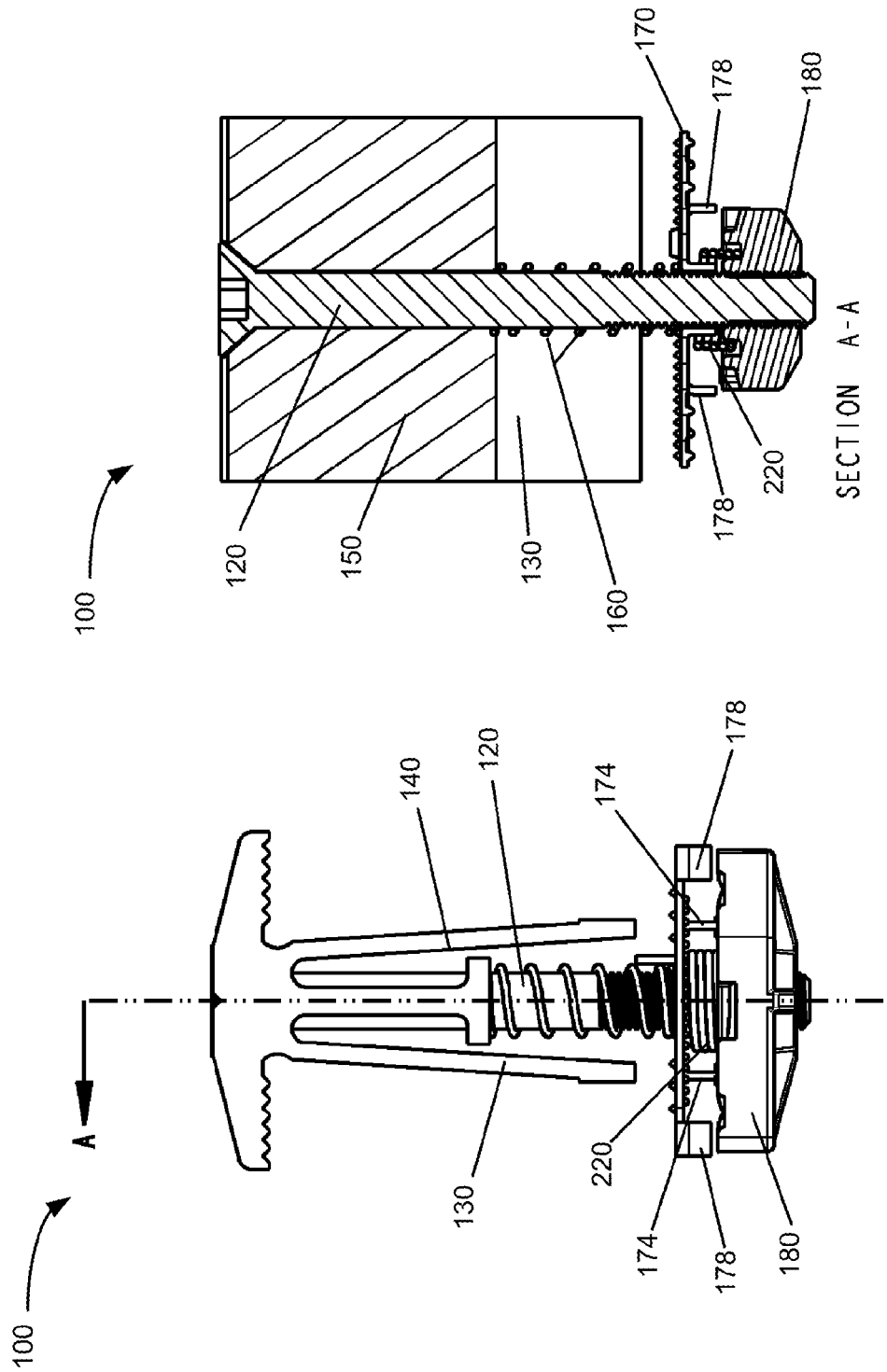

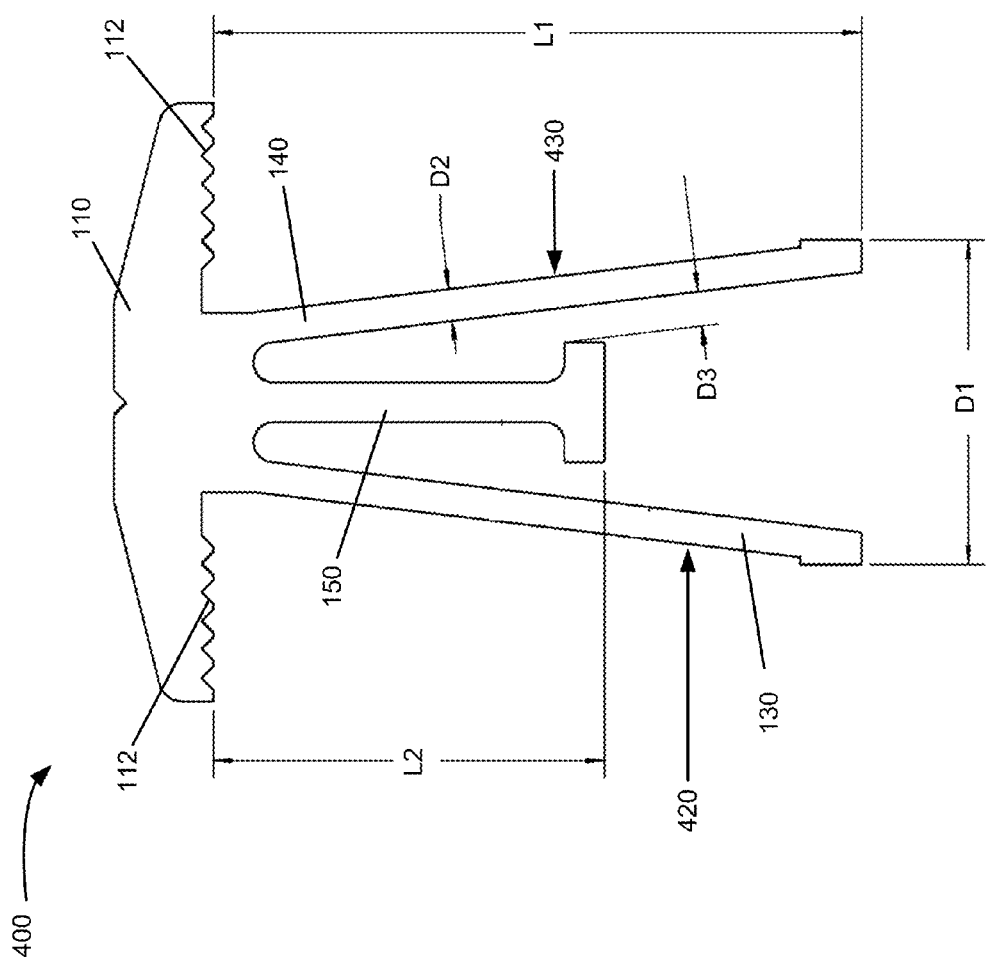

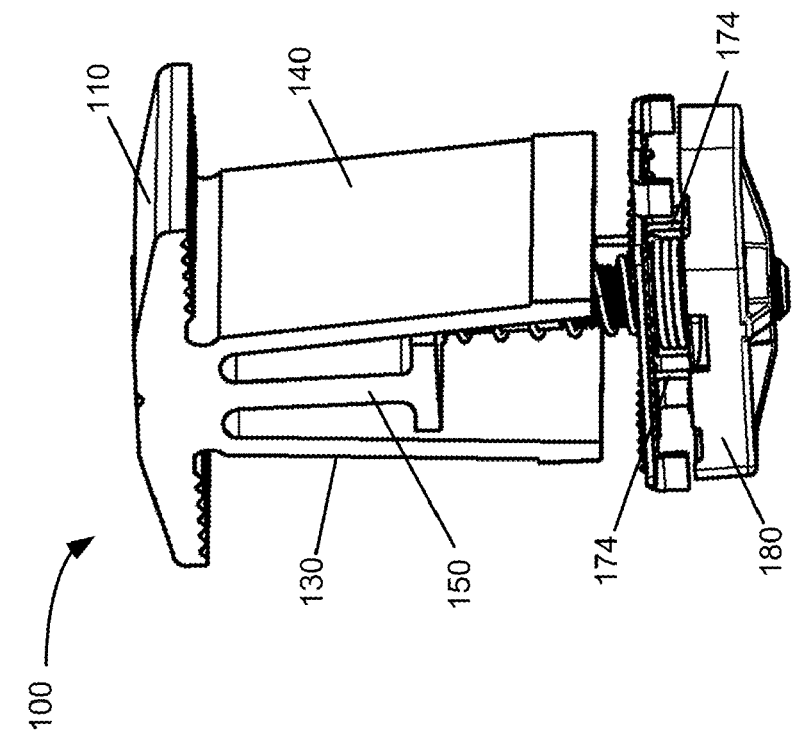
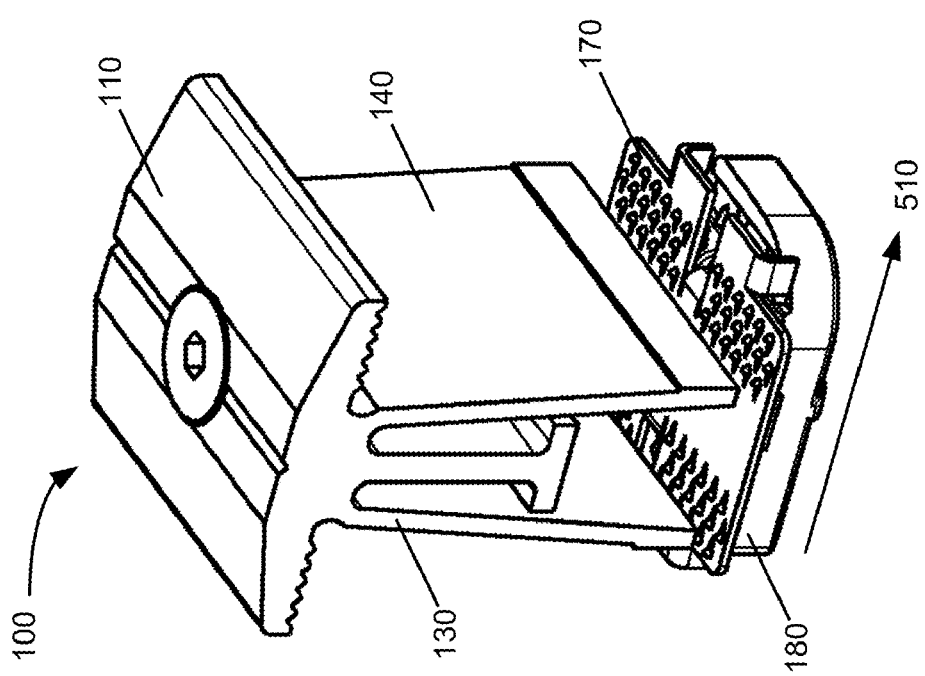

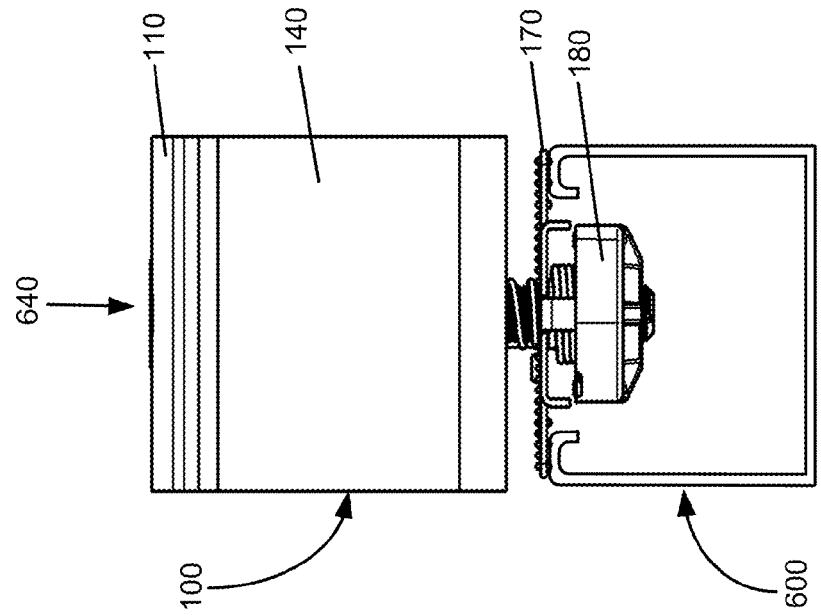
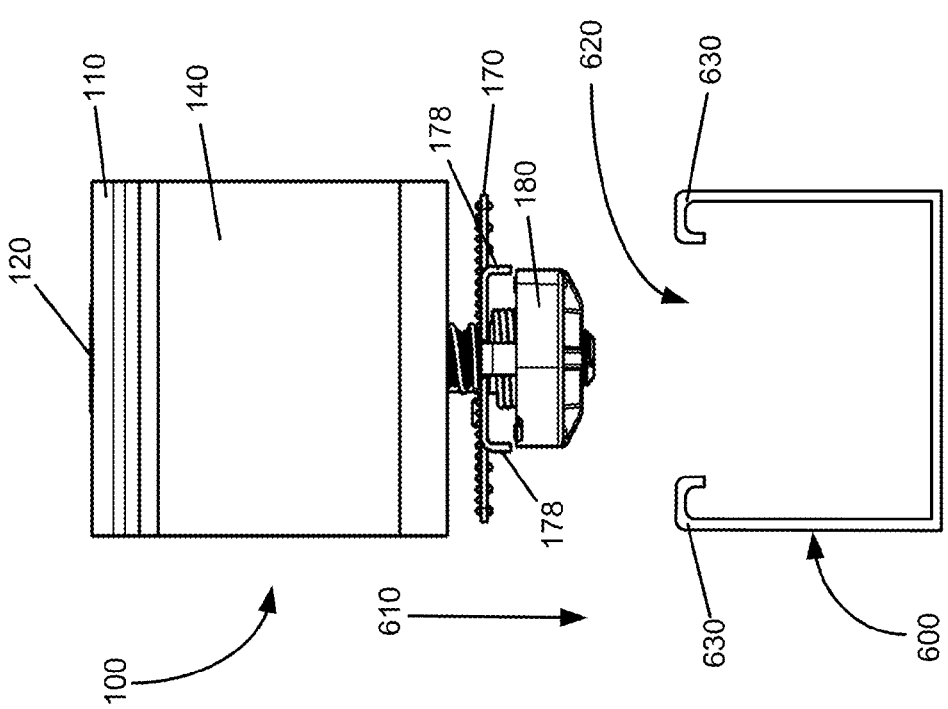

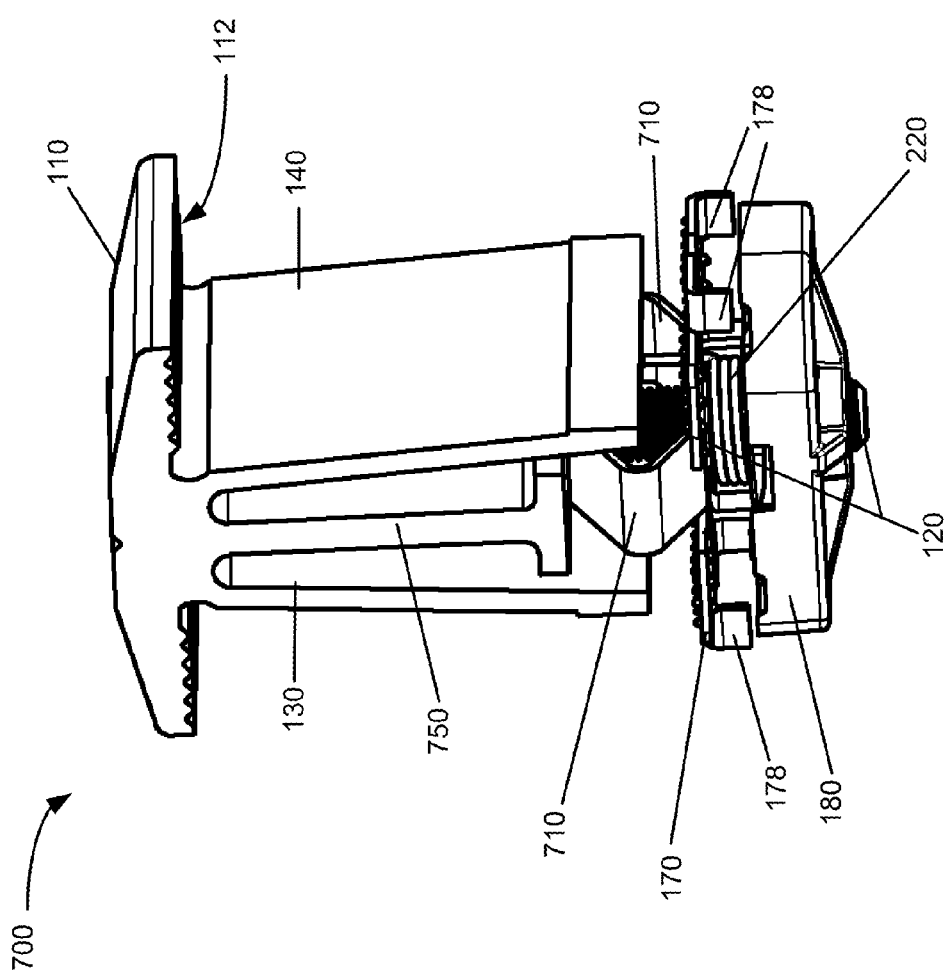

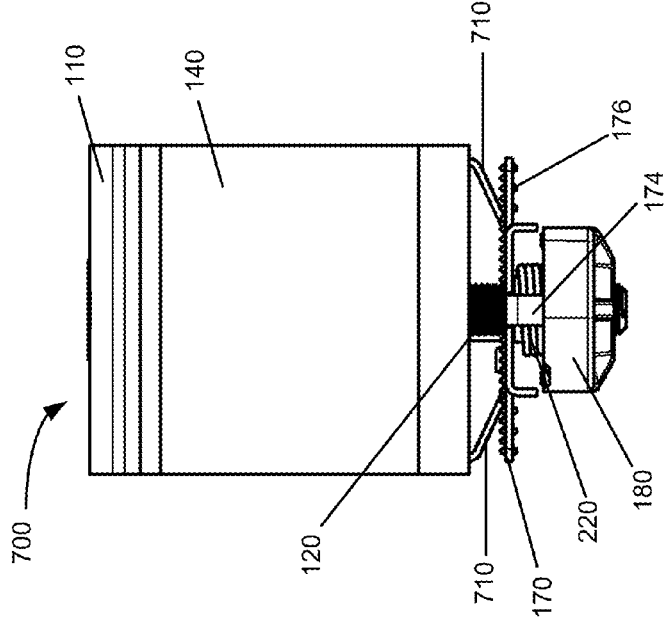
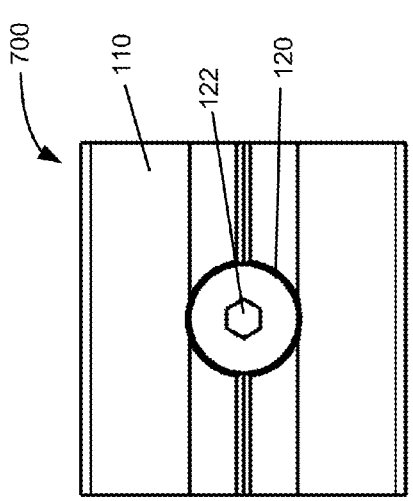
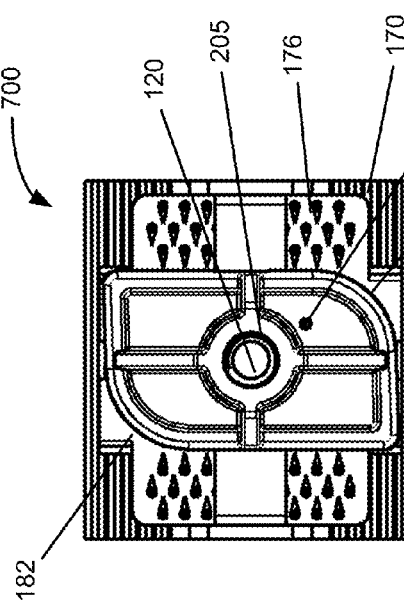

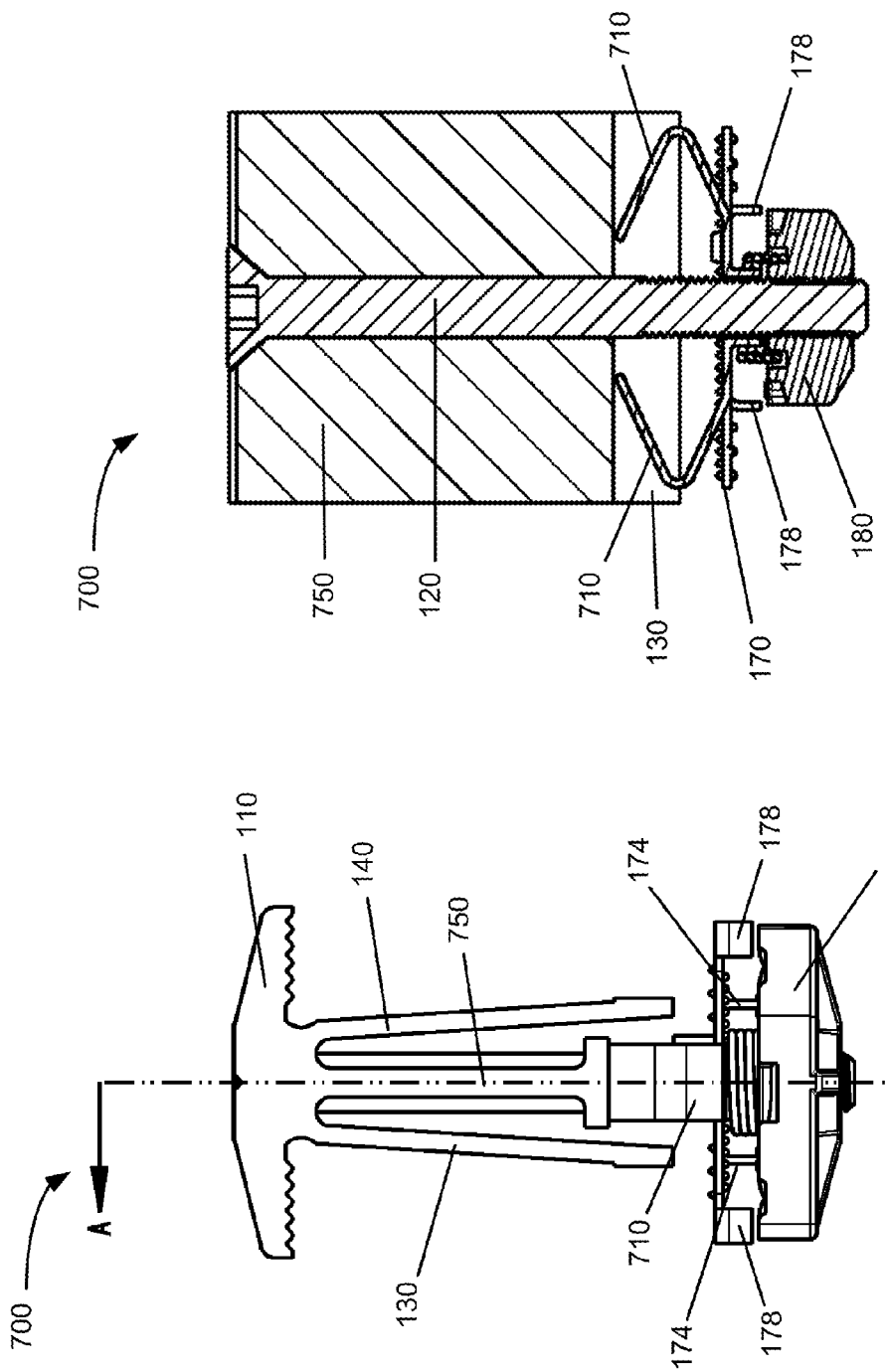

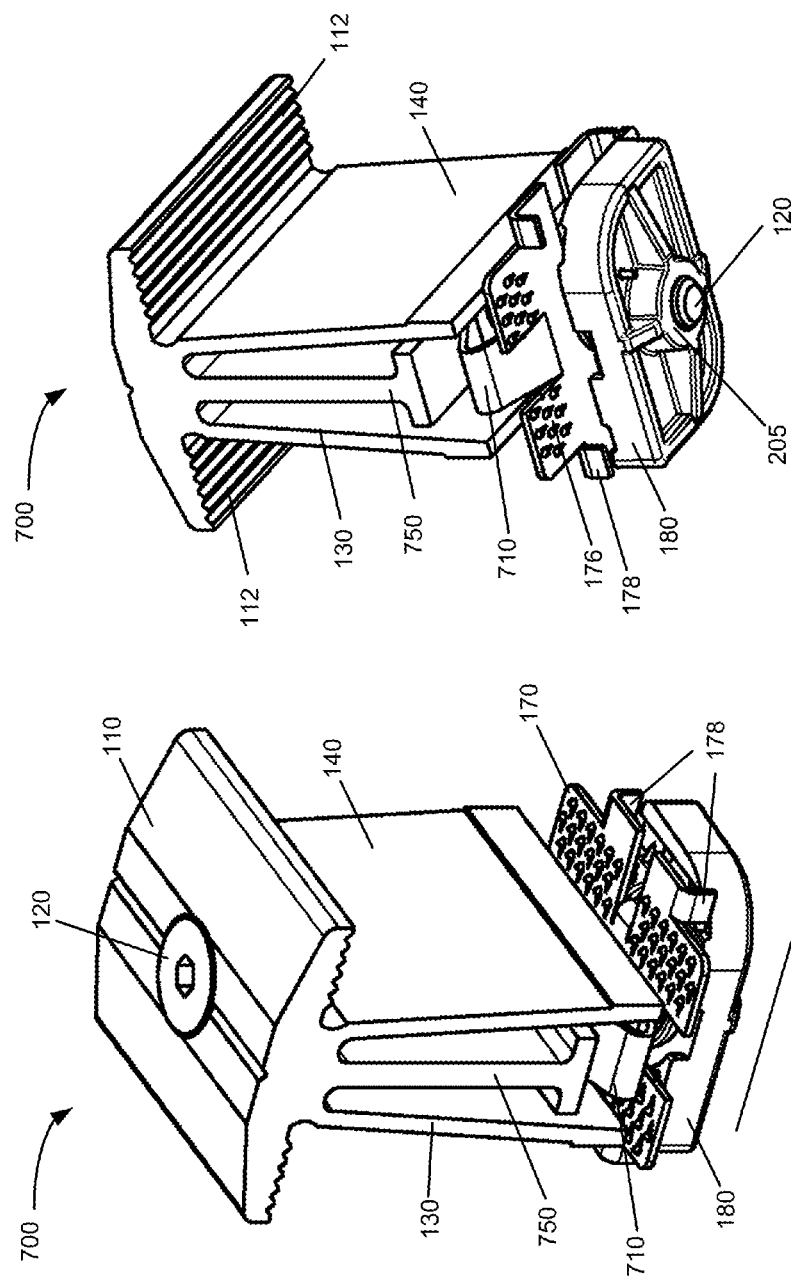

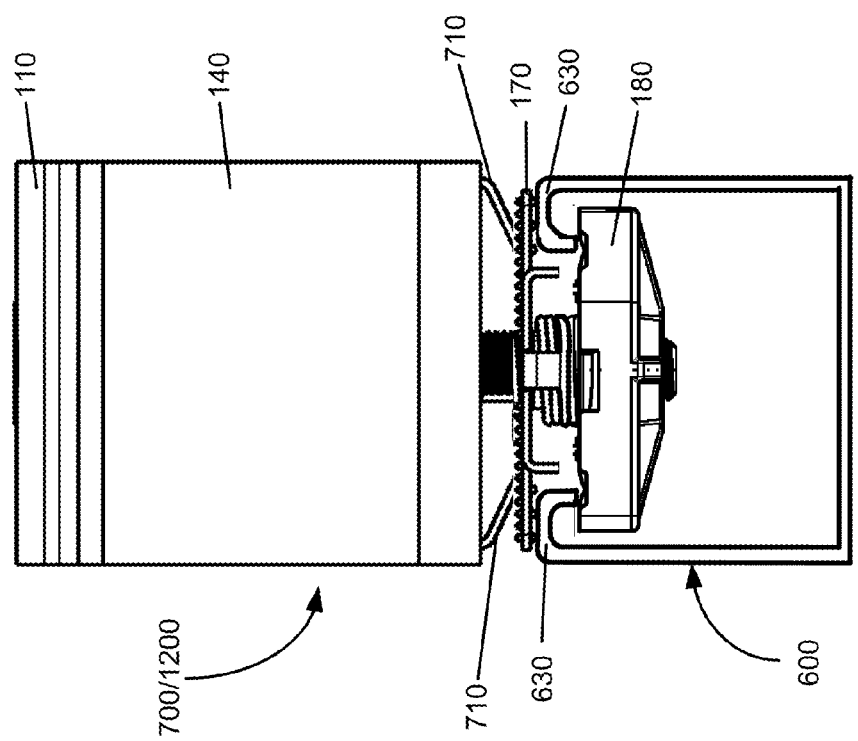

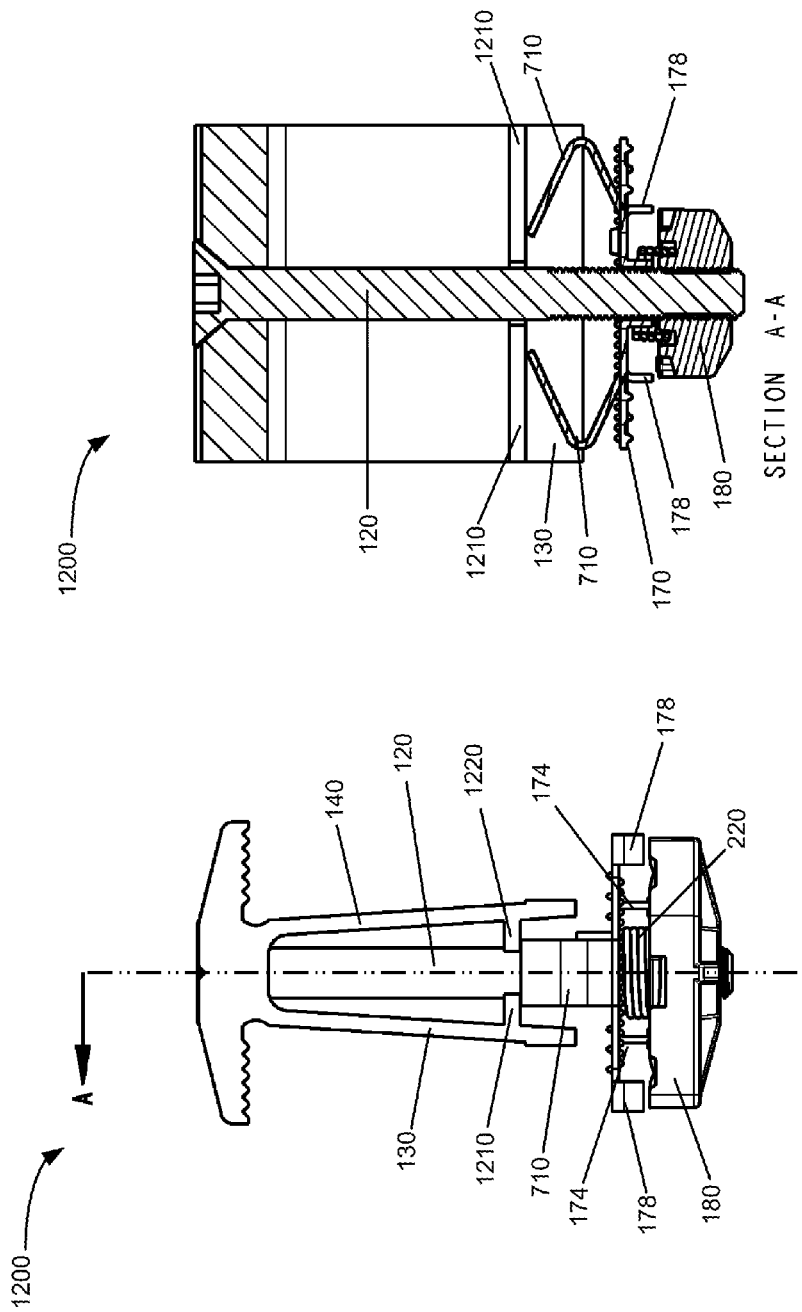

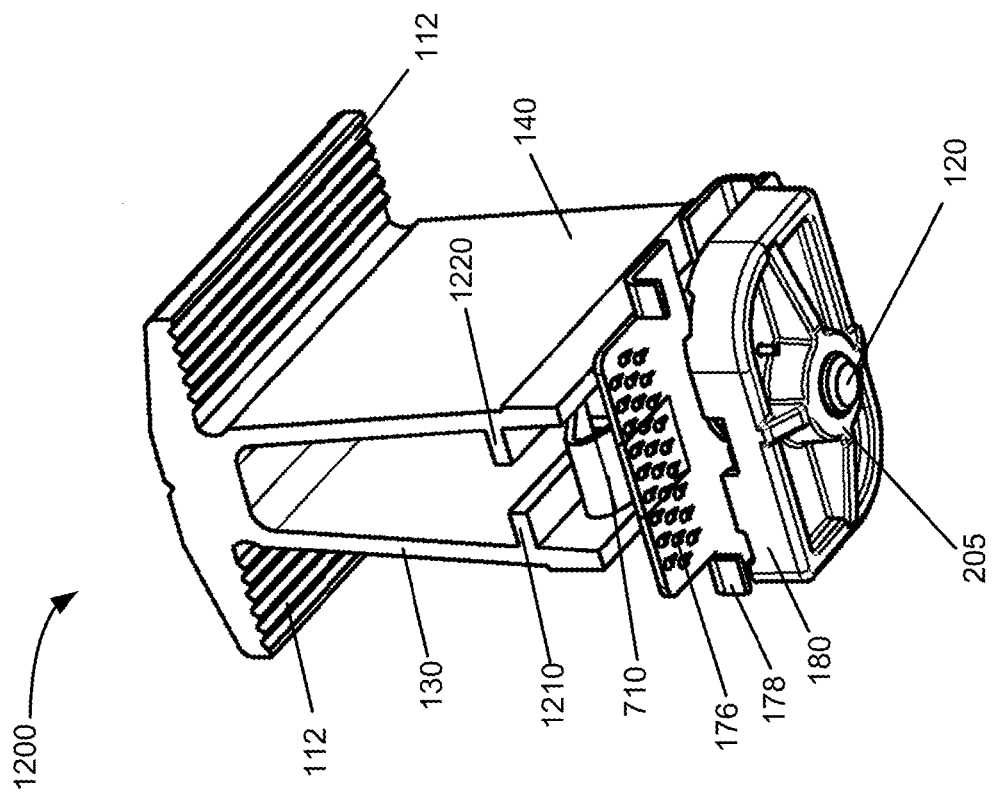
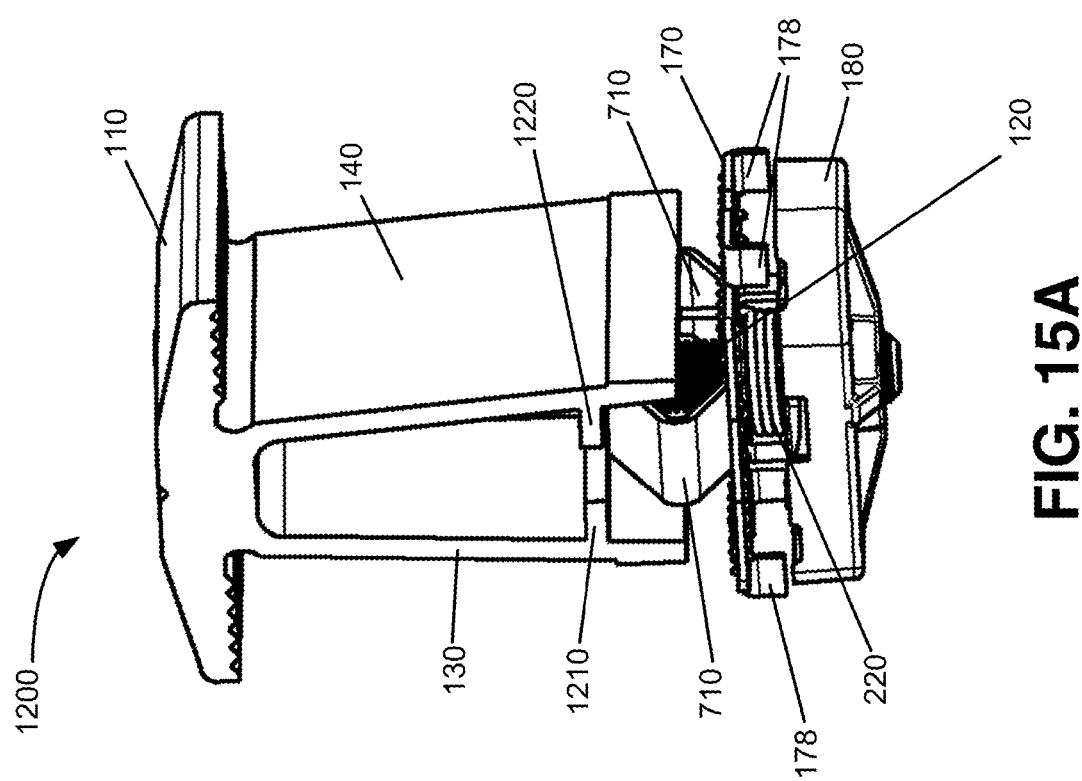

PANEL CLAMP

BACKGROUND INFORMATION

Traditional clamps often include spring nuts that provide compression at a lower portion of the nut to hold the clamp to another structure, such as a strut. One drawback with such clamps is that installation requires two hands. That is, one hand is used to depress the entire assembly, while the other hand rotates the spring nut to the proper position. In many situations, the installer must install the clamp while in an awkward position and having two free hands is not always possible. Therefore, using conventional clamps is often a difficult task.

BRIEF DESCRIPTION OF THE DRAWINGS

FIGS. 2A, 2B and 2C are top, bottom and side views, respectively, of the clamp of FIG. 1 according to an exemplary implementation;

FIGS. 3A and 3B are a side view and a sectional view, respectively, of the clamp of FIG. 1;

FIGS. 4A and 4B are an isometric view and side view, respectively, of a portion of the clamp of FIG. 1;

FIGS. 5A, 5B and 5C are additional isometric views of the clamp of FIG. 1;

FIGS. 6A, 6B and 6C are side views illustrating connecting the clamp of FIG. 1 to a strut channel;

FIG. 7 is an isometric view of a clamp consistent with another exemplary implementation;

FIGS. 8A, 8B and 8C are top, bottom and side views, respectively, of the clamp of FIG. 7 according to an exemplary implementation;

FIGS. 9A and 9B are a side view and a sectional view, respectively, of the clamp of FIG. 7;

FIGS. 10A and 10B are additional isometric views of the clamp of FIG. 7;

FIG. 11 is a side view illustrating connecting the clamp of FIG. 7 or the clamp of FIG. 12 to a strut channel;

FIGS. 14A and 14B are a side view and a sectional view, respectively, of the clamp of FIG. 12;

FIGS. 15A and 15B are additional isometric views of the clamp of FIG. 12;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a clamp that that may be used in combination with a structural member, such as a strut channel, to clamp another member to the strut channel. In an exemplary implementation, the clamp may include a rotatable nut and a torsion spring. The rotatable nut may be held in place when the clamp is an initial position prior to connecting to the strut channel. When the clamp is to be connected to the strut channel, an installer may press a top portion of the clamp to release the rotatable nut. In response, the torsion spring causes the rotatable nut to automatically rotate into place within the strut channel. An installer may then tighten a clamp screw to secure the member/structure that is to be clamped to the strut channel.

Figure 1:
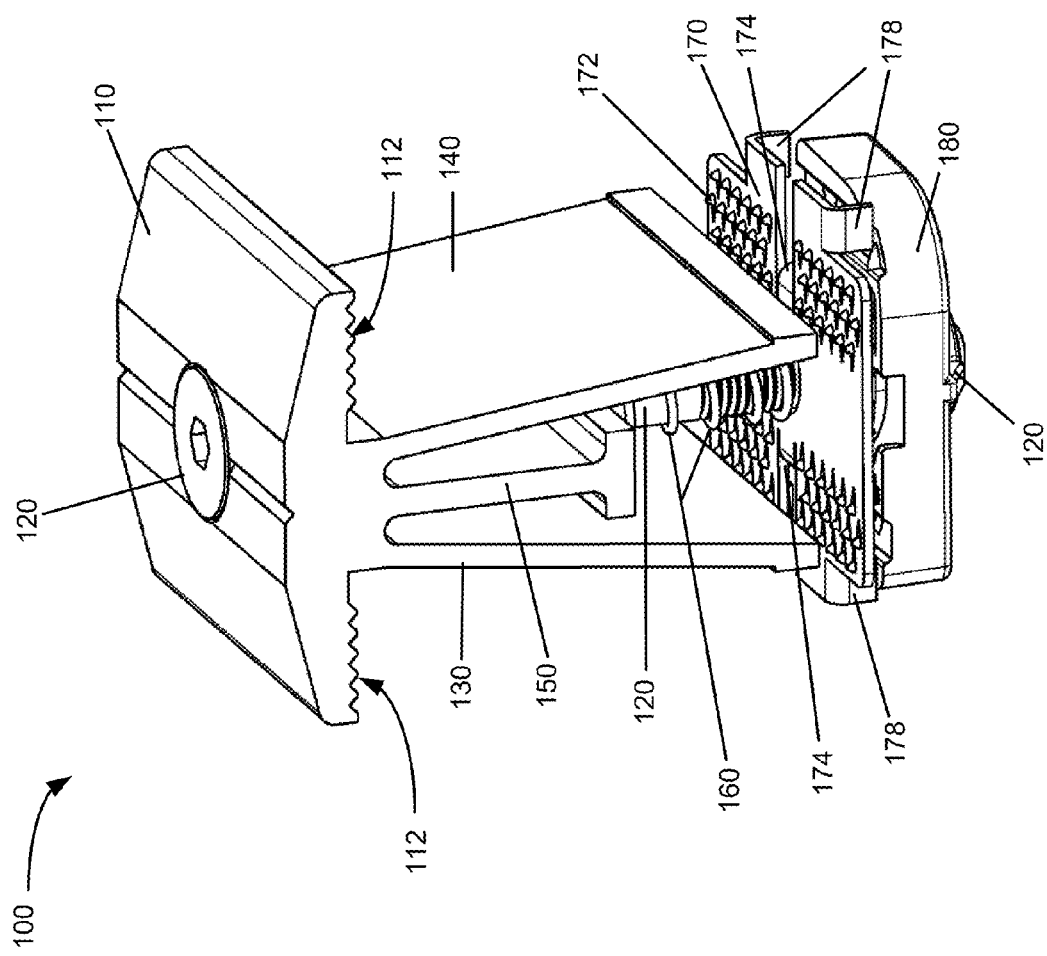
FIG. 1 is an isometric view of a clamp consistent with an exemplary implementation.

FIG. 1 is an isometric view of an exemplary clamp assembly 100 (also referred to as panel clamp assembly 100 or panel clamp 100). Referring to FIG. 1, panel clamp 100 includes top portion 110, clamp screw 120, side members 130 and 140, center member 150, spring 160, grounding washer 170 and strut nut 180. A torsion spring (not shown in FIG. 1 may located between grounding washer 170 and strut nut 180. In an exemplary implementation, the components illustrated in FIG. 1 may be fabricated out of metal, such as steel (e.g., galvanized steel), aluminum, copper or some other metal. In other implementations, all or some of the components illustrated in FIG. 1 may be fabricated using other materials, such as plastic or composite materials. Top portion 110 may be generally rectangular in shape and may have a beveled upper surface. The lower surfaces 112 of top portion 110 may include grooves or ridges 112 to facilitate gripping a structure that is to be clamped.

Side members 130 and 140 and center member 150 may project or extend from top portion 110 in an inverted "w" shape. In an exemplary implementation, side members 130 and 140 may flex or bend to allow the structure that clamp 100 is holding to expand without damaging clamp 100 and/or the structure, as described in detail below. In an exemplary implementation, top portion 110, side members 130 and 140 and center member 150 may be formed as a unitary structure with a through hole to receive clamp screw 120.

Clamp screw 120 may be a threaded bolt or screw that extends through the center of top portion 110, center member 150, grounding washer 170 and strut nut 180, as illustrated in FIG. 1. Clamp screw 120 may be tightened such that the lower portion of clamp screw 120 extends through strut nut 180 when clamp 100 is securing two structures together.

Spring 160 may be a coil spring positioned about clamp screw 120 between the lower surface of center member 150 and the upper surface of grounding washer 170. Spring 160 may compress when force is applied to the top portion of clamp 100, as described in detail below.

Grounding washer 170 may be a relatively flat surface that includes a hole for clamp screw 120. In an exemplary implementation, grounding washer 170 may be fabricated using stainless steel, beryllium copper or some other metal/alloy that may have spring-like properties. Grounding washer 170 may contact a structure, such as a solar panel, that clamp 100 may secure to another structure (e.g., a strut channel). Grounding washer 170 may also include a number of elevated portions or ridges 172, referred to herein as teeth 172, that provide for continuous grounding for the structure that will be secured by clamp 100. That is, teeth 172 may help ensure that the frame of the structure secured by clamp 100 will maintain continuous electrical contact with a structure support member to which clamp 100 will attach. This may allow the structures clamped together by clamp 100 to be grounded.

Grounding washer 170 may also include legs 174 located on either side of grounding washer 170 opposite the opening for clamp screw 120. Legs 174 may be relatively short extensions or tabs that extend in a downward direction from the upper surface of grounding washer 170. Legs 174 may be held in place on positive stop areas (e.g., indentations) located on the upper surface of strut nut 180 when clamp 100 is not connected to another member (e.g., a strut channel), as described in more detail below.

Grounding washer 170 may further include four tabs 178 (three shown in FIG. 1) located along the sides of grounding washer 170. Tabs 178 may be used to align clamp 100 within a channel. For example, tabs 178 may be used to locate or position clamp 100 within a center of a channel structure, as described in more detail below.

Strut nut 180 may include a central, threaded opening to receive clamp screw 120. Strut nut 180, as described briefly above, may also include structures (e.g., indentations) to receive legs 174 that hold strut nut 180 in place. For example, strut nut 180 may include recessed areas or other types of positive mechanical stops located on the upper surface of strut nut 180 that receive and retain legs 174. These recessed areas function to hold strut nut 180 in place while clamp 100 is not connected to any other member/structure.

FIG. 2A is a top view of clamp 100 of FIG. 1 consistent with an exemplary implementation. Referring to FIG. 2A, clamp screw 120 is located in a central bore of top portion 110. In an exemplary implementation, the top of clamp screw 120 may include an opening 122 to receive a hexagonal tool to tighten clamp screw 120 when a structure is ready to be clamped by clamp 100.

FIG. 2B is a bottom view of clamp 100 of FIG. 1 consistent with an exemplary implementation. Referring to FIG. 2B, the bottom portion of strut nut 180 includes a threaded opening 205 to receive clamp screw 120. The bottom surface of grounding washer 170 also includes elevated structures 176 similar to teeth 172. In one implementation, structures 176 (also referred to herein as teeth 176) have a tear-drop like shape and may provide for continuous grounding between clamp 100 and a structure to which clamp 100 will be connected, such as a strut channel. For example, the lower surface of grounding washer 170 may rest on a strut channel. Teeth 176 may ensure that the frame of the structure secured by clamp 100 has a continuous electrical connection to, for example, a ground point. Teeth 172 and 176 may also ensure grounding penetration through, for example, anodized aluminum coatings on solar panel frames, strut channel surface imperfections and/or non-conductive coatings associated with structures secured by clamp 100.

As also illustrated in FIG. 2B, strut nut 180 has a generally rectangular cross-sectional shape with corners 182 and 184 being rounded. The rounded shape of strut nut 180 facilitates movement of strut nut 180 within a strut channel, as described in detail below. Strut nut 180 also includes a hole 210 to retain one end of torsion spring 220 (shown in FIG. 2C). The torsion spring, as described in detail below, provides a force to automatically turn strut nut 180 when legs 174 are released from the stops on strut nut 180.

FIG. 2C illustrates a side view of clamp 100 of FIG. 1 consistent with an exemplary implementation. Referring to FIG. 2C, the lower portion of clamp 100 includes torsion spring 220 encircling clamp screw 120 between grounding washer 170 and the upper surface of strut nut 180. As described above, one end of torsion spring 220 may be retained in hole 210 and the other end of torsion spring 220 may be retained in another hole or opening in an upper surface of grounding washer 170 (not shown). Torsion spring 220 may operate to provide tension to move strut nut 180 when legs 174 are released from their stops. For example, when force is exerted on the top portion of clamp 100, spring 160 compresses and legs 174 are released from the positive stops on strut nut 180. Torsion spring 220 may then cause strut nut 180 to rotate 90 degrees to a position in which the longer side of strut nut 180 is perpendicular to the open side of a strut channel, as described in more detail below.

FIG. 3A illustrates a side view of clamp 100. Referring to FIG. 3A, legs 174 are shown located in stops or indentations located on the upper surface of strut nut 180. Torsion spring 220, as described above, provides a force to rotate strut nut 180 when legs 174 are released from the stops in the upper surface of strut nut 180. Grounding washer 170, as described above, may also include four tabs 178 (two shown in FIG. 3A) located along the sides of grounding washer 170. Tabs 178 may approximately align with the sides of strut nut 180 and may facilitate positioning clamp 100 within a framing member/channel.

FIG. 3B illustrates a cross-section of clamp 100 of FIG. 3A taken along line AA. Referring to FIG. 3B, clamp screw 120 extends down through clamp 100. Spring 160, as described above, is located in the lower portion of clamp 100 between center member 150 and grounding washer 170. When the top portion of clamp 100 is pressed, center member 150 may apply a force on spring 160. Spring 160 may compress and the lower portion of strut nut 180 may drop, thereby releasing legs 174 from the stops in the upper surface of strut nut 180. Torsion spring 220 may cause strut nut 180 to automatically rotate approximately 90 degrees (e.g., in the clockwise direction) such that the longer sides of strut nut 180 are located across or perpendicular to the opening of, for example, a strut channel, as described in detail below.

Figure 4A:
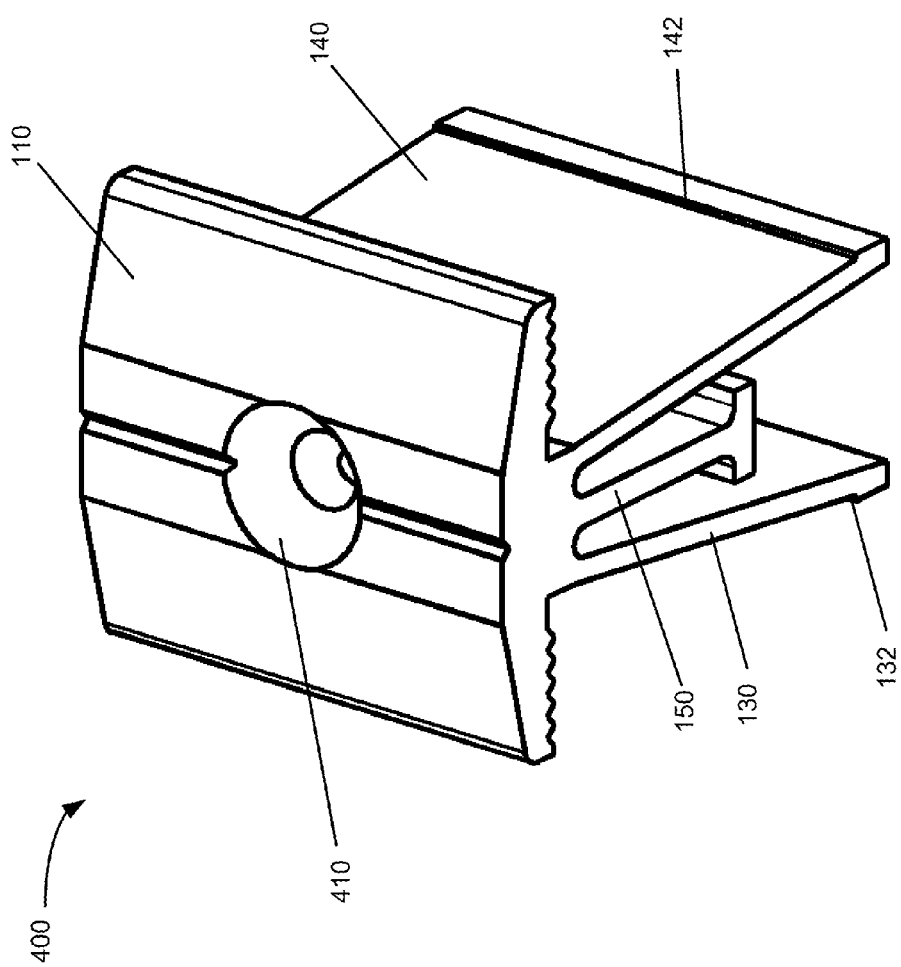

As described above, in some implementations, top portion 110, side members 130 and 140 and center member 150 of clamp 100 may be formed as a unitary structure. For example, FIG. 4A illustrates an isometric view of structure 400 that includes top portion 110, side members 130 and 140 and center member 150. As illustrated, structure 400 includes hole 410 to receive clamp screw 120. Structure 400 may be made a metal, such as stainless steel, aluminum or any other metal. As also described previously, side members 130 and 140 may flex to allow for thermal expansion in structures (e.g., solar panels) secured by clamp 100. Side members 130 and 140 may also include small lip areas 132 and 142, respectively, as shown in FIG. 4A. In some implementations, these lip areas 132 and 142 may facilitate connection to a device to be secured by clamp 100.

FIG. 4B illustrates a side view of structure 400. Referring to FIG. 4B, L1 may represent the distance from ridges 112 to the lowest portion of structure 400 and L2 may represent the distance from ridges 112 to the bottom of center member 150. In an exemplary implementation, L1 may range from approximately 1.0 inches to approximately 2.0 inches and L2 may range from approximately 0.5 inches to 1.5 inches. In one particular implementation in which clamp 100 is used to clamp a solar panel to a strut channel, L1 may be approximately 1.625 inches and L2 may be approximately 0.98 inches.

D1 may represent the maximum distance between the outer surfaces of side members 130 and 140 and D2 may represent the thickness of side members 130 and 140. In an exemplary implementation, D1 may range from approximately 0.5 inches to 1.5 inches and D2 may range from approximately 0.05 inches to 0.25 inches. In one particular implementation, D1 may be approximately 0.813 inches and D2 may be approximately 0.08 inches. Side members 130 and 140, as described above, may be formed of metal having a relatively thin thickness to allow side members 130 and 140 to flex or deflect inwardly when pressure is exerted. Referring to FIG. 4B, D3 may represent the shortest distance from side members 130/140 to center member 150. In an exemplary implementation, D3 may range from approximately 0.05 inches to 0.25 inches. For example, in one particular implementation, D3 may be 0.087 inches. In each case, side members 130 and 140 may allow for movement of panels or structures secured by clamp 100, such as movement caused by thermal expansion, vibration, wind, etc., that exert a force on side portions 130 and 140, represented by arrows 420 and 430, respectively.

The dimensions described above with respect to structure 400 of clamp 100 are exemplary only. It should be understood that other dimensions may be used for L1, L2 and D1-D3 based on the particular implementation and devices/structures to which clamp 100 is intended to secure. In each case, expansion of a member clamped by clamp 100 may exert a force on side members 130 and 140. Side members 130 and 140 may be pushed inwardly toward center member 150 to allow expansion of the structural member to not adversely affect clamp 100 and/or the members secured by clamp 100.

Figure 5C:
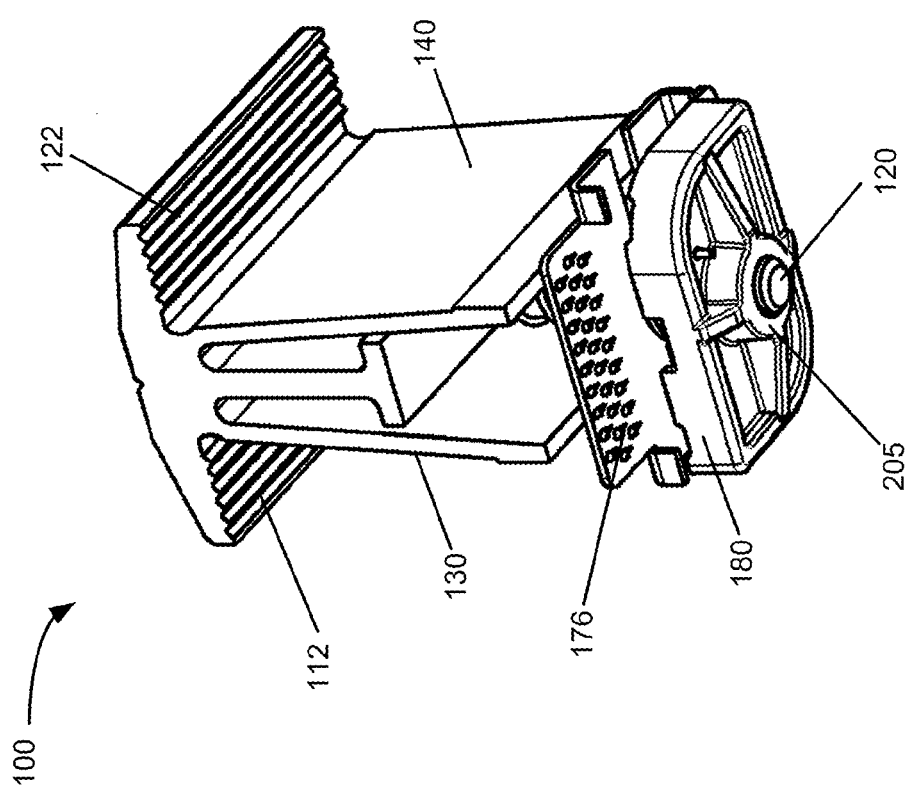

FIGS. 5A-5C provide additional isometric views of clamp 100. As illustrated in FIG. 5A, clamp 100 may be inserted into a strut channel (not shown) oriented in the direction illustrated by arrow 510. That is, in the initial position, the shorter side of strut nut 180 may be perpendicular to the opening in the strut channel. FIG. 5B illustrates strut nut 180 in the initial position. For example, legs 174 in FIG. 5B are secured in stops in the upper surface of strut nut 180. FIG. 5C illustrates clamp 100 from a bottom perspective. As illustrated, the lower portion of strut nut 180 includes a threaded opening 205 to receive clamp screw 120. As further illustrated, the lower surface of grounding washer 170 includes teeth 176 that may rest on a strut channel, as described in more detail below.

Figure 6C:
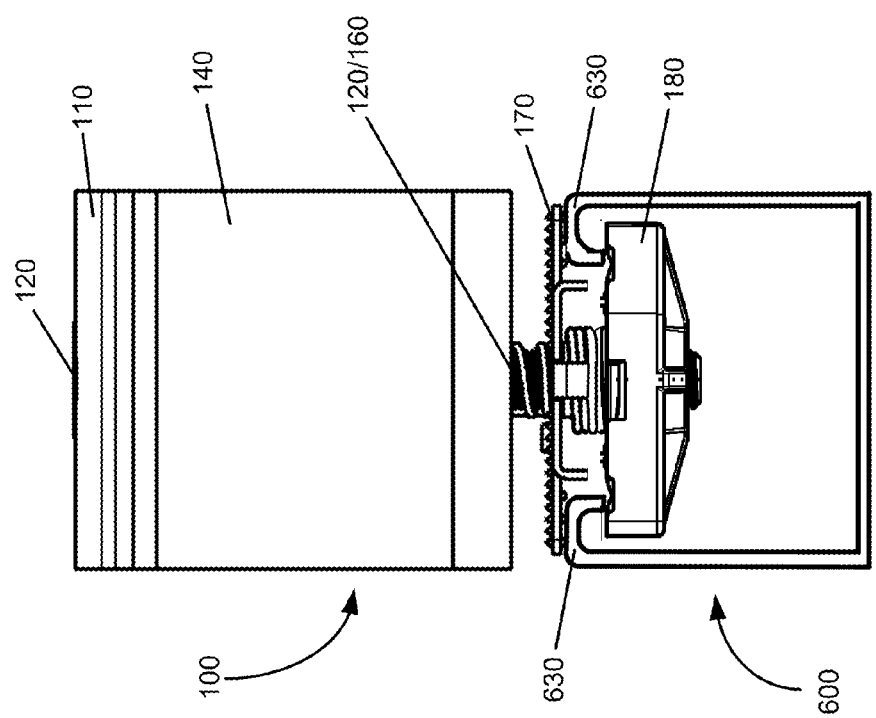

FIGS. 6A, 6B and 6C illustrates cross-sections of clamp 100 and a structure 600 to which clamp 100 will be connected. In an exemplary implementations, structure 600 may be a framing channel or strut channel (also referred to herein as strut 600). In an exemplary implementation, strut 600 may be one of a large number of struts used to support a solar table assembly that includes a number of solar panels (not shown in FIG. 6A). It should be understood, however, that structure 600 may be associated with any type of structural member that may be used to support other types of equipment.

In each case, an installer may place the lower portion of clamp 100 into opening 620 in strut 600, as indicated by arrow 610. As described above, tabs 174 may be used to align clamp 100 within strut 600. For example, tabs 178 may be centered within opening 620 so that strut nut 180 will have room to rotate when clamp 100 is transitioning from the unclamped position to the clamped position. As also described above, when clamp 100 is in an unclamped position, grounding washer 170 and teeth 176 located on the lower surface of grounding washer 170 may rest on the curved upper surfaces 630 of strut 600, as illustrated in FIG. 6B. As discussed previously, teeth 176 may provide for continuous electrical contact and grounding between clamp 100 and strut 600.

After clamp 100 is placed in strut 600 as illustrated in FIG. 6B, the installer may exert pressure on top portion 110 of clamp 100, as indicated by arrow 640. In some implementations, the installer may exert pressure on the top of clamp screw 120. The pressure on top portion 110 and/or the top of clamp screw 120 may compress spring 160, move strut nut 180 in a downward direction and cause legs 174 to disengage from the positive stops located on the upper surface of strut nut 180. Torsion spring 220 may automatically exert a force to cause strut nut 180 to rotate approximately 90 degrees in, for example, the clockwise direction to the position illustrated in FIG. 6C. Referring to FIG. 6C, the longer side of strut nut 180 is perpendicular to opening 620, thereby securing strut nut 180 to strut 600. In this manner, clamp 100 may be connected to strut 600 using a single hand. That is, an installer may place clamp 100 into opening 620 of strut 600 and apply pressure to top portion 110 and/or the top of clamp screw 120 to secure clamp 100 to strut 600.

Clamp 100 may then be used to clamp another structure to strut 600. For example, in one implementation, a photovoltaic module (also referred to herein as a solar panel) may be placed between ridges 112 and the upper surface of grounding washer 170. In FIG. 6C, the frame of the photovoltaic module/solar panel would abut side member 140, and the lower portion of the frame of the photovoltaic module/solar panel would rest on the upper surface of grounding washer 170. The installer may then tighten clamp screw 120 to tighten the solar panel between ridges 112 and grounding washer 170. In this manner, the solar panel may be quickly clamped to strut 600. In some implementations, clamp 100 may be used to secure two solar panels. That is, a photovoltaic module or solar panel may be located on either side of clamp 100. In such a situation, one photovoltaic module/solar panel may abut side member 130 and the other photovoltaic module/solar panel may abut side member 140. In each case, clamp screw 120 may be tightened to secure the solar panel or frame of the photovoltaic module/solar panel between grounding washer 170 and ridges 112. In this manner, the exposed frame (e.g., metallic frame) of a photovoltaic module/solar panel may be electrically bonded to the exposed metallic frame of an adjacent photovoltaic module/solar panel via clamp 100.

FIG. 7 is an isometric view of a clamp 700 in accordance with another implementation. In this implementation, clamp 700 may include essentially the same elements as clamp 100 with the exception of coil spring 160. In the implementation illustrated in FIG. 7, clamp 700 includes two leaf springs 710 located between a lower surface of center member 750 and grounding washer 170. Leaf springs 710 may each be made of metal that flexes or bends as pressure is exerted on top portion 110 and provides a spring force. In one implementation, leaf springs 710 and grounding washer 170 may be formed as a unitary structure.

FIGS. 8A-8C are top, bottom and side views, respectively, of clamp 700 consistent with an exemplary implementation. Referring to FIG. 8A, similar to FIG. 2A, clamp screw 120 is located in a central bore of top portion 110 and the top of clamp screw 120 may include an opening 122 to receive a hexagonal tool to tighten clamp screw 120 when a structure is ready to be clamped by clamp 700. Referring to FIG. 8B, the bottom portion of strut nut 180 includes a threaded, central opening 205 to receive clamp screw 120. The bottom surface of grounding washer 170 also includes elevated structures 176 similar to teeth 172. Similar to the discussion above with respect to FIG. 2B, structures 176 may provide for continuous grounding between clamp 700 and a structure to which clamp 700 will be connected, such as a strut channel. Teeth 172 and 176 may also ensure grounding penetration through, for example, anodized aluminum coatings on solar panel frames, strut channel surface imperfections and/or non-conductive coatings associated with structures secured by clamp 700.

As also illustrated in FIG. 8B, strut nut 180 includes a hole 210 to retain one end of torsion spring 220 (shown in FIG. 8C). Torsion spring 220, as described above, provides a force to automatically turn strut nut 180 when legs 174 are released from the stops on strut nut 180.

Referring to FIG. 8C, the lower portion of clamp 700 includes torsion spring 220 encircling clamp screw 120 between grounding washer 170 and the upper surface of strut nut 180. In this implementation, clamp screw 120 is not encircled by a coil spring, such as spring 160. Instead, leaf springs 710 compress and provide spring forces for clamp

700. As described above, one end of torsion spring 220 may be retained in hole 210 and the other end of torsion spring 220 may be retained in another hole or opening in an upper surface of grounding washer 170 (not shown). As also illustrated in FIG. 8C, the lower portions of leaf springs 710 contact grounding washer 710. Leaf springs 710 may compress when pressure is exerted on top portion 110, as described in detail below.

FIG. 9A illustrates a side view of clamp 700. Referring to FIG. 9A, legs 174 are shown located in stops or indentations located on the upper surface of strut nut 180. Torsion spring 220, as described above, provides a force to rotate strut nut 180 when legs 174 are released from the stops in the upper surface of strut nut 180. Leaf springs 710 (one shown in FIG. 9A) may be located between center portion 750 and grounding washer 170. Similar to coil spring 160, leaf springs 710 may compress when pressure is exerted on top portion 110.

FIG. 9B illustrates a cross-section of clamp 700 of FIG. 9A taken along line AA. Referring to FIG. 9B, clamp screw 120 extends down through clamp 700. Leaf springs 710, as described above, are located in the lower portion of clamp 700 between center member 750 and grounding washer 170. When the top portion of clamp 100 is pressed, For example, center member 750 may apply a force on leaf springs 710. Leaf springs 710 may compress and the lower portion of strut nut 180 may drop, thereby releasing legs 174 from the stops in the upper surface of strut nut 180. Torsion spring 220 may cause strut nut 180 to automatically rotate approximately 90 degrees in the clockwise direction such that the longer sides of strut nut 180 are located across or perpendicular to the opening of, for example, a strut channel, as described in detail below.

FIGS. 10A and 10B provide additional isometric views of clamp 700. As illustrated in FIG. 10A, clamp 700 may be inserted into a strut channel (not shown) oriented in the direction illustrated by arrow 1010. Similar to clamp 100, the shorter side of strut nut 180 may be perpendicular to the opening in the strut channel. FIG. 10B illustrates clamp 700 from a bottom perspective. As illustrated, the lower portion of strut nut 180 includes a threaded opening 205 to receive clamp screw 120. As further illustrated, the lower surface of grounding washer 170 includes teeth 176 that may rest on a strut channel, as described in more detail below.

FIG. 11 is a cross-section of clamp 700 connected to strut 600. Similar to the discussion above with respect to FIG. 6A, an installer may place the lower portion of clamp 700 into an opening (e.g., opening 620 shown in FIG. 6A) in strut 600. As described above, when clamp 700 is in an unclamped position, grounding washer 170 and teeth 176 located on the lower surface of grounding washer may rest on the curved upper surfaces 630 of strut 600. As discussed previously, teeth 176 may provide for continuous electrical contact and grounding between clamp 700 and strut 600.

After clamp 700 is placed in strut 600, the installer may exert pressure on top portion 110 of clamp 700. In some implementations, the installer may exert pressure on the top of clamp screw 120. The pressure on top portion 110 and/or the top of clamp screw 120 of clamp 700 may compress leaf spring 710, move strut nut 180 in a downward direction and cause legs 174 to disengage from the positive stops located on the upper surface of strut nut 180. Torsion spring 220 may automatically exert a force to cause strut nut 180 to rotate approximately 90 degrees in, for example, the clockwise direction to the position illustrated in FIG. 11. Referring to FIG. 11, the longer side of strut nut 180 is perpendicular to opening 620, thereby securing strut nut 180 to strut 600. In this manner, clamp 700 may be connected to strut 600 using a single hand. That is, an installer may place clamp 700 into opening 620 of strut 600 and apply pressure to top portion 110 and/or the top of clamp screw 120 to secure clamp 700 to strut 600.

Clamp 700 may then be used to clamp another structure to strut 600. For example, similar to the discussion above with respect to FIG. 6C, in one implementation, a solar panel may be placed between ridges 112 and the upper surface of grounding washer 170. The installer may then tighten clamp screw 120 to tighten the solar panel between ridges 112 and grounding washer 170. In this manner, the solar panel may be quickly clamped to strut 600. As also described above, in some implementations, clamp 700 may be used to secure two solar panels. That is, a solar panel may be located on either side of clamp 700. In such a situation, one solar panel may abut side member 130 and the other solar panel may abut side member 140. In each case, clamp screw 120 may be tightened to secure the solar panel or frame of the solar panel between grounding washer 170 and ridges 112. In this manner, the exposed metallic frame of a photovoltaic module/solar panel may be electrically bonded to the exposed metallic frame of an adjacent photovoltaic module/solar panel via clamp 700. Side members 130 and 140 may also flex or deflect inwardly to allow for movement (e.g., thermal expansion) of the solar panels.

Figure 12:
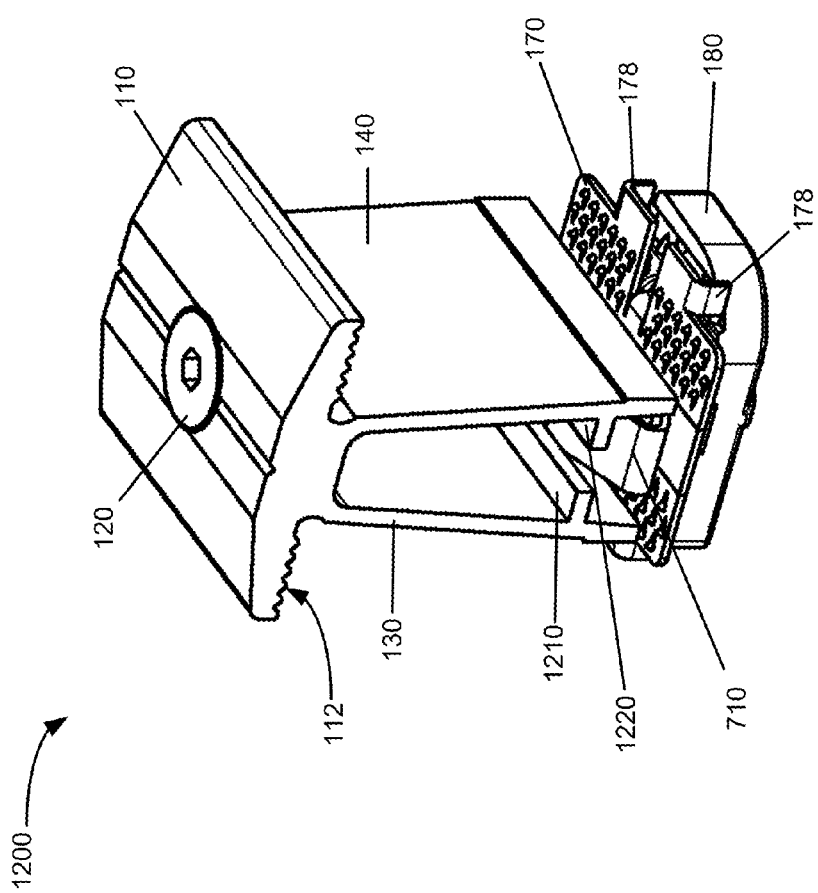
FIG. 12 is an isometric view of a clamp consistent with another exemplary implementation.

FIG. 12 is an isometric view of a clamp 1200 in accordance with another exemplary implementation. In this implementation, clamp 1200 may include essentially the same elements as clamp 600 with the exception of center member 750. In the implementation illustrated in FIG. 12, clamp 1200 includes members 1210 and 1220, also referred to herein as flanges 1210 and 1220, that project inwardly from side members 130 and 140, respectively. Leaf springs 710 may be located between the lower surfaces of flanges 1210 and 1220 and grounding washer 170. The upper portion of leaf springs 710 may abut or contact the lower surfaces of flanges 1210 and 1220. Leaf springs 710 may each be made of metal that flexes or bends as pressure is exerted on top portion 110 and/or the top of clamp screw 120 to provide a spring force. In one implementation, leaf springs 710 and grounding washer 170 may be formed as a unitary structure.

Figure 13C:
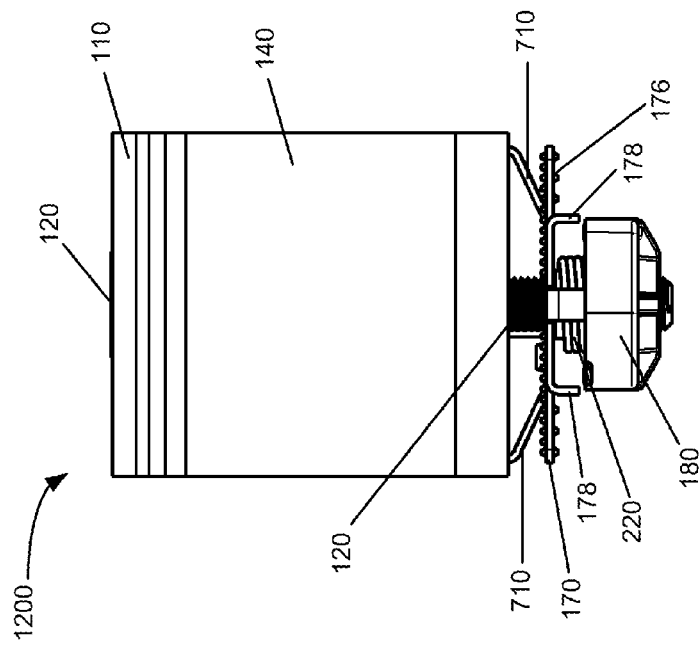
FIGS. 13A, 13B and 13C are top, bottom and side views, respectively, of the clamp of FIG. 12 according to an exemplary implementation.
Figure 13A:
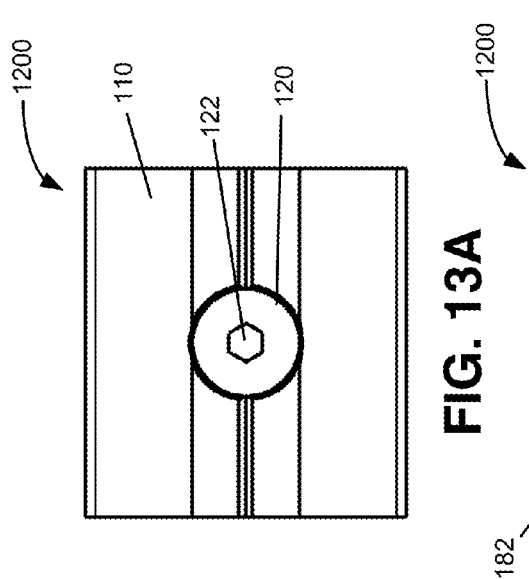
Figure 13B:
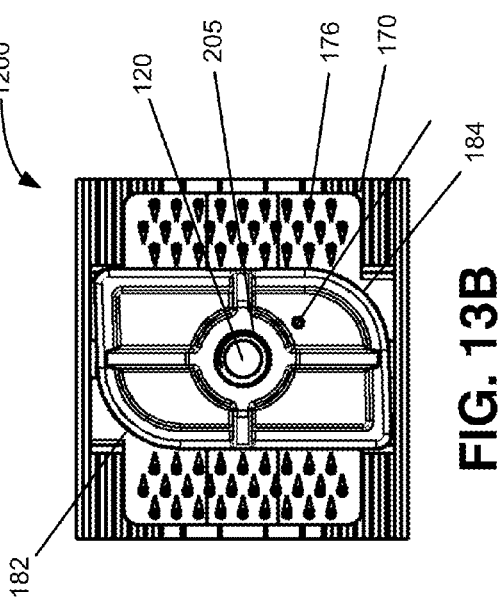

FIGS. 13A-13C are top, bottom and side views, respectively, of clamp 1200 consistent with an exemplary implementations. The top, bottom and side views of clamp 1200 may be similar to those shown in FIGS. 8A-8C for clamp 700. Referring to FIG. 13A, similar to FIG. 8A, clamp screw 120 is located in a central bore of top portion 110 and the top of clamp screw 120 may include an opening 122 to receive a hexagonal tool to tighten clamp screw 120 when a structure is ready to be clamped by clamp 1200. Referring to FIG. 13B, the bottom portion of strut nut 180 includes a threaded, central opening 205 to receive clamp screw 120. The bottom surface of grounding washer 170 also includes elevated structures 176 similar to teeth 172. Similar to the discussion above with respect to FIG. 13B, structures 176 may provide for continuous grounding between clamp 1200 and a structure to which clamp 1200 will be connected, such as a strut channel. Teeth 172 and 176 may also ensure grounding penetration through, for example, anodized aluminum coatings on solar panel frames, strut channel surface imperfections and/or non-conductive coatings associated with structures secured by clamp 700.

As also illustrated in FIG. 13B, strut nut 180 includes a hole 210 to retain one end of torsion spring 220 (shown in FIG. 13C). Torsion spring 220, as described above, provides a force to automatically turn strut nut 180 when legs 174 are released from the stops on strut nut 180.

Referring to FIG. 13C, the lower portion of clamp 1200 includes torsion spring 220 encircling clamp screw 120 between grounding washer 170 and the upper surface of strut nut 180. In this implementation, clamp screw 120 is not encircled by a coil spring, such as spring 160. Instead, leaf springs 710 compress and provide spring forces for clamp 1200. As described above, one end of torsion spring 220 may be retained in hole 210 and the other end of torsion spring 220 may be retained in another hole or opening in an upper surface of grounding washer 170 (not shown). As also illustrated in FIG. 13C, the lower portions of leaf springs 710 contact grounding washer 710. Leaf springs 710 may compress when pressure is exerted on top portion 110, as described in detail below.

FIG. 14A illustrates a side view of clamp 1200. Referring to FIG. 14A, flanges 1210 and 1220 project substantially perpendicularly from side members 130 and 140, respectively. Flanges 1210 and 1220 do not contact each other, as illustrated in FIG. 14A. That is, the middle portion located between side members 130 and 140 is open to allow clamp screw 120 to extend through grounding washer 170 and strut nut 180, without having to extend through flanges 1210 or 1220. Legs 174 are shown located in stops or indentations located on the upper surface of strut nut 180. Torsion spring 220, as described above, provides a force to rotate strut nut 180 when legs 174 are released from the stops in the upper surface of strut nut 180. Leaf springs 710 (one shown in FIG. 14A) may be located between flanges 1210 and 1220 and grounding washer 170. Similar to coil spring 160, leaf springs 710 may compress when pressure is exerted on top portion 110.

FIG. 14B illustrates a cross-section of clamp 1200 of FIG. 14A taken along line AA. Referring to FIG. 14B, clamp screw 120 extends down through clamp 1200. Leaf springs 710, as described above, are located in the lower portion of clamp 1200 between flanges 1210 and 1220 and grounding washer 170. For example, the lower portion of flanges 1210 and 1220 may contact the upper portion of leaf springs 710. When the top portion 110 of clamp 100 is pressed, flanges 1210 and 1220 may exert a force on leaf springs 710. Leaf springs 710 may compress and the lower portion of strut nut 180 may drop, thereby releasing legs 174 from the stops in the upper surface of strut nut 180. Torsion spring 220 may cause strut nut 180 to automatically rotate approximately 90 degrees in the clockwise direction such that the longer sides of strut nut 180 are located across or perpendicular to the opening of, for example, a strut channel, as described in detail below.

FIGS. 15A and 15B provide additional isometric views of clamp 1200. Similar to the discussion above with respect to clamp 700, clamp 1200 may be inserted into a strut channel with the shorter side of strut nut 180 being perpendicular to the opening in the strut channel. FIG. 15B illustrates clamp 1200 from a bottom perspective. As illustrated, the lower portion of strut nut 180 includes a threaded opening 205 to receive clamp screw 120. As further illustrated, the lower surface of grounding washer 170 includes teeth 176 that may rest on a strut channel, as described in more detail below.

Similar to the discussion above with respect to FIG. 11, an installer may place the lower portion of clamp 1200 into an opening (e.g., opening 620 shown in FIG. 6A) in strut 600. When clamp 1200 is in an unclamped position, grounding washer 170 and teeth 176 located on the lower surface of grounding washer may rest on the curved upper surfaces 630 of strut 600. Teeth 176 may provide for continuous electrical contact and grounding between clamp 1200 and strut 600.

After clamp 1200 is placed in strut 600, the installer may exert pressure on top portion 110 of clamp 1200. In some implementations, the installer may exert pressure on the top of clamp screw 120. The pressure on top portion 110 and/or the top of clamp screw 120 of clamp 1200 may force flanges 1210 and 1220 to compress leaf spring 710, move strut nut 180 in a downward direction and cause legs 174 to disengage from the positive stops located on the upper surface of strut nut 180. Torsion spring 220 may automatically exert a force to cause strut nut 180 to rotate approximately 90 degrees in, for example, the clockwise direction to the position illustrated in FIG. 11. Referring to FIG. 11, the longer side of strut nut 180 is perpendicular to opening 620, thereby securing strut nut 180 to strut 600. In this manner, clamp 1200 may be connected to strut 600 using a single hand. That is, an installer may place clamp 1200 into opening 620 of strut 600 and apply pressure to top portion 110 and/or the top of clamp screw 120 to secure clamp 1200 to strut 600.

Clamp 1200 may then be used to clamp another structure to strut 600. For example, similar to the discussion above with respect to FIG. 11, in one implementation, a solar panel may be placed between ridges 112 and the upper surface of grounding washer 170. The installer may then tighten clamp screw 120 to tighten the solar panel between ridges 112 and grounding washer 170. In this manner, the solar panel may be quickly clamped to strut 600. As also described above, in some implementations, clamp 1200 may be used to secure two solar panels. That is, a solar panel may be located on either side of clamp 1200. In such a situation, one solar panel may abut side member 130 and the other solar panel may abut side member 140. In each case, clamp screw 120 may be tightened to secure the solar panel or frame of the solar panel between grounding washer 170 and ridges 112. In this manner, the exposed metallic frame of a photovoltaic module/solar panel may be electrically bonded to the exposed metallic frame of an adjacent photovoltaic module/solar panel via clamp 1200.

Side members 130 and 140 may also flex or deflect inwardly to allow for movement (e.g., thermal expansion) of the solar panels. That is, in an exemplary implementation, flanges 1210 and 1220 may not abut or contact clamp screw 120 so that side members 130 and 140 (and flanges 1210 and 1220) may flex or deflect inwardly to allow for movement (e.g., thermal expansion) of the solar panels.

Figure 16:
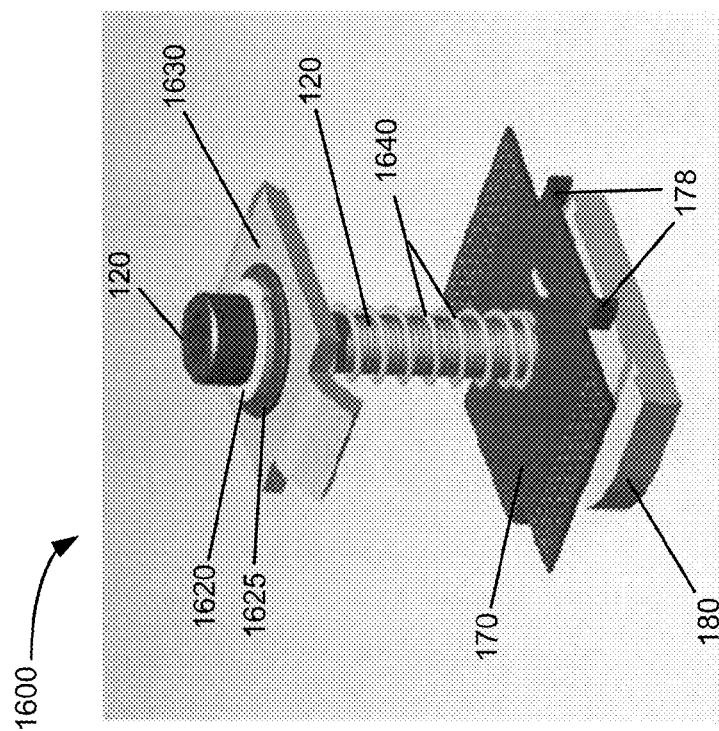
FIG. 16 an isometric view of a clamp consistent with another exemplary implementation.

FIG. 16 is an isometric view of a clamp 1600 in accordance with another implementation. In this implementation, clamp 1600 may include many of the same elements as clamps 100, 700, and/or 1200. For example, clamp 1600 may include clamp screw 120, grounding washer 170, strut nut 180 and torsion spring 220 (not shown in FIG. 16). Clamp 1600, however, may not include structure 400 or the structures located in the upper portions of clamps 700 and 1200 illustrated in FIGS. 7 and 12. For example, referring to FIG. 16, clamp 1600 may include lock washer 1620 and washer 1625, flange washer 1630 and compression spring 1640. Flange washer 1630 may contact a structure/equipment to be secured by clamp 1600. For example, in one implementation, clamp 1600 may secure a solar panel, as described in more detail below.

Figure 17:
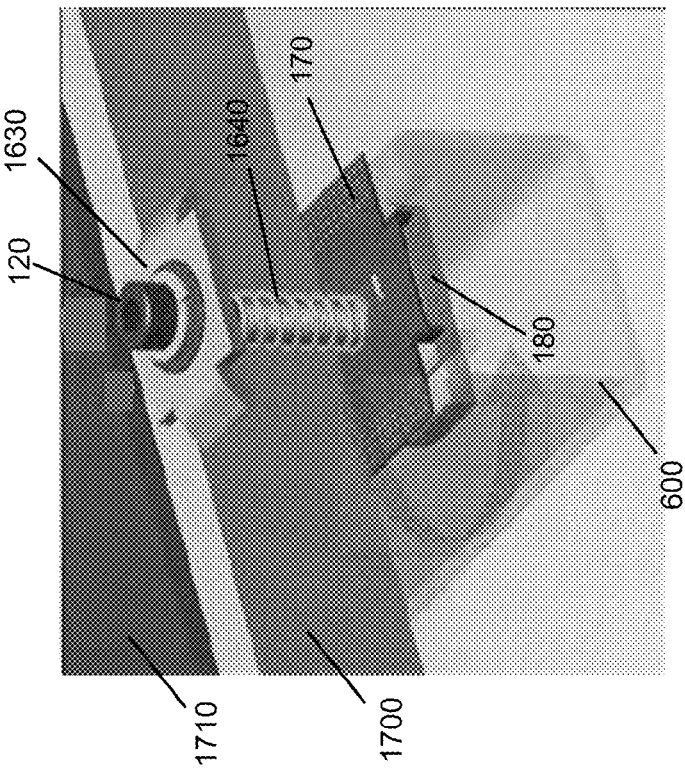
FIG. 17 is an isometric view illustrating the clamp of FIG. 16 connecting a first structure to a second structure.

In the implementation illustrated in FIG. 16, clamp 1600 operates in a similar manner as clamps 100, 700 and 1200. For example, an installer may place clamp 1600 in an opening in a channel structure, such as strut channel 600 with the shorter side of strut nut 180 being perpendicular to the opening. An installer may then press on the upper surface of clamp screw 120 to release legs 174 (not shown in FIG. 16) of grounding washer 170 from strut nut 180. Torsion spring 220 may then rotate strut nut approximately 90 degrees in the clockwise direction such that the longer side of strut nut 180 is perpendicular to the opening in strut channel 600, as illustrated in FIG. 17. Spring 1640 may also provide a biasing force to keep flange washer 1630 located in position near the top of clamp 1600 for securing another structure to clamp 1600, as described below.

Clamp 1600 may then be used to clamp another structure to strut 600. For example, FIG. 17 illustrates a solar panel frame 1700 and solar panel 1710 that is placed between flange washer 1630 and grounding washer 170. The installer may then tighten clamp screw 120 to tighten the solar panel frame 1700 (and solar panel 1710) to strut channel 600. As described above, compression spring 1640 may provide a biasing force to ensure that flange washer 1630 is in position for clamping solar panel frame 1700. Compression spring 1640 may also provide a biasing force on grounding washer 170 to ensure that grounding washer 170 is in position for clamping solar panel frame 1700. This further simplifies the installer's task with respect to clamping solar panel frame 1700.

Similar to the discussion above with respect to clamps 100, 700 and 1200, in some implementations, clamp 1600 may be used to secure two solar panels. That is, solar panel frame 1700 and solar panel 1710 may be located on one side of clamp 1600 and another solar panel frame/solar panel may be located on the opposite side. In each case, clamp screw 120 may be tightened to secure the solar panel frames/solar panels between flange washer 1630 and grounding washer 170. In this manner, the exposed metallic frame of a photovoltaic module/solar panel may be electrically bonded to the exposed metallic frame of an adjacent photovoltaic module/solar panel via clamp 1600.

As described above, a clamp (e.g., one of clamps 100, 700, 1200 or 1600) may allow an installer to easily connect a clamp to a framing member. For example, the installer may use one hand to position the clamp within a framing member, and apply pressure to the top portion of the clamp and/or the top portion of the clamp screw to secure the clamp to the framing member (e.g., strut 600).

In some implementations, the clamp and framing member may be pre-assembled prior to shipment to a work site. For example, clamp 100, clamp 700, clamp 1200 and/or clamp 1600 may be shipped attached to strut channel 600. This may further help save time with respect to clamping another structural member to framing member 600.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, in an alternative implementation, strut nut 180 may be replaced by a conventional nut and a flat washer that retains a spring. In this implementation, pressure may be exerted on the spring to cause the nut to release from the stop position and torsion spring 220 may operate to rotate the nut into the proper position within strut channel 600. In still other implementations, no spring may be needed. For example, pressure exerted on the top of clamp 100, 700, 1200 and/or 1600 may force strut nut 180 to release from its initial position. In such an implementation, no additional spring (e.g., spring 160, 710, 1640) may be needed.

In addition, various features have been mainly described above with respect to using clamp 100/700/1200/1600 to secure a structure, such as a solar panel, to a framing channel. In other implementations, clamps 100/700/1200/1600 may be used to clamp other structures together.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An assembly, comprising:
a channel member; and
a clamp configured to clamp a first structure to the channel member, the clamp comprising:
a first member comprising side portions and a center portion, the first member including a center opening,
a washer including an opening and at least one portion protruding in a downward direction from an upper surface of the washer,
a nut having an upper surface, a lower surface and a threaded opening,
a threaded bolt disposed through the center opening of the first member, the opening of the washer and the threaded opening of the nut,
a spring disposed adjacent a lower portion of the threaded bolt between the center portion of the first member and the washer, and
a torsion spring located between the washer and the nut, wherein the torsion spring causes the nut to rotate when force is applied to an upper part of the first member.

2. The assembly of claim 1, wherein when force is applied to the upper part of the first member, the at least one portion of the washer is released from a mechanical stop located on an upper surface of the nut and the nut rotates approximately 90 degrees within an opening of the channel member.

3. The assembly of claim 1, wherein the at least one portion of the washer comprises a first portion and a second portion located on opposite sides of the opening in the washer, and wherein the nut further comprises:
a first recessed area located on the upper surface of the nut, the first recessed area configured to receive the first portion of the washer when the clamp is in an unclamped position, and
a second recessed area located on the upper surface of the nut, the second recessed area configured to receive the second portion of the washer when the clamp is in the unclamped position.

4. The assembly of claim 1, wherein the spring comprises a coil spring disposed around a portion of the threaded bolt.

5. The assembly of claim 1, wherein the spring comprises at least one leaf spring positioned between the first member and the washer.

6. The assembly of claim 1, wherein the first structure comprises a solar panel and the clamp is configured to secure the solar panel between the first member and the washer.

7. The assembly of claim 6, wherein the washer includes a first plurality of raised portions on its upper surface to contact a frame of the solar panel, and a second plurality of raised portions on its lower surface to contact the channel member, the first and second plurality of raised portions providing grounding contacts for the solar panel.

8. The assembly of claim 6, wherein the solar panel is configured to abut a first one of the side portions, and wherein the first side portion is configured to move toward the center portion of the first member in response to force exerted by thermal expansion of the solar panel.

9. The assembly of claim 1, wherein the nut has a substantially rectangular cross-sectional shape with two shorter sides and two longer sides and wherein the longer sides are configured to be located substantially parallel to the length of the channel member when the clamp is in an unclamped position, and be located perpendicular to the length of the channel member when the clamp is in the clamped position.

10. The assembly of claim 1, wherein the channel member and the clamp are pre-assembled.

11. A clamp, comprising:
a first member comprising side portions and having a first opening;
a washer including a second opening and at least one portion protruding in a downward direction from an upper surface of the washer;
a nut having an upper surface, a lower surface and a threaded opening;
a threaded bolt disposed through the first opening, the second opening and the threaded opening;
a spring located between a portion of the first member and the washer; and
a torsion spring located around the threaded bolt between the washer and the nut, wherein the torsion spring causes the nut to rotate when force is applied to an upper part of the first member.

12. The clamp of claim 11, wherein when force is applied to the upper part of the first member, the at least one portion is released from a recessed area located on an upper surface of the nut and the nut rotates approximately 90 degrees within an opening of a channel member to which the clamp is coupled.

13. The clamp of claim 11, wherein the at least one portion comprises a first portion and a second portion located on opposite sides of the second opening, and wherein the nut further comprises:
a first recessed area located on the upper surface of the nut, the first recessed area configured to receive the first portion of the washer when the clamp is in an unclamped position, and
a second recessed area located on the upper surface of the nut, the second recessed area configured to receive the second portion of the washer when the clamp is in the unclamped position.

14. The clamp of claim 11, wherein the spring comprises a coil spring disposed around a portion of the threaded bolt, or two leaf springs located on opposite sides of the threaded bolt.

15. The clamp of claim 11, wherein the washer includes a first plurality of raised portions on its upper surface to contact a first structure to be secured by the clamp, and a second plurality of raised portions on its lower surface to contact a second member to which the first member is to be clamped, the first and second plurality of raised portions providing grounding for the first structure.

16. The clamp of claim 15, wherein the first structure comprise a first solar panel configured to abut a first one of the side portions, and wherein the clamp is configured to:
secure a second solar panel that abuts a second one of the side portions, and
electrically bond a frame of the first solar panel to a frame of the second solar panel.

17. The clamp of claim 11, wherein the nut has a substantially rectangular cross-sectional shape with two shorter sides and two longer sides and wherein the longer sides are configured to be located substantially parallel to the length of a channel member connected to the clamp when the clamp is in an unclamped position, and be located perpendicular to the length of the channel member when the clamp is in the clamped position.

* * * * *